Patented Jan. 17, 1939

2,143,839

UNITED STATES PATENT OFFICE 2,143,839

PSEUDOCYANINE DYES AND PROCESS OF PREPARING THEM

Leslie G. S. Brooker, Rochester, N. Y., assignor, by mesne assignments, to Eastman Kodak Company, Jersey City, N. J., a corporation of New Jersey No Drawing. Application June 29, 1932, Serial No. 619,960

24 Claims. (Cl. 260—240)

This invention relates to new compositions of matter, and more particularly to a new class of sensitizing dyes and methods for their preparation, such dyes being known as the oxazolo, thiazolo and selenazolo pseudo-cyanines.

In my co-pending application Serial No. 548,025, filed June 30, 1931 (now U. S. Patent 1,994,562 dated March 19, 1935), it is shown that bases of the thiazole series give rise to dyes which have been termed neothiazolocarbocyanines. These and related bases also give rise, as referred to in that application, to dyes of the pseudo-cyanine type.

It is, therefore, among the objects of the present invention to provide a new class of pseudo cyanine dyes and methods for their preparation. Other objects will appear upon a further perusal of this specification.

The nomenclature adopted in the present application is based upon that already existing in other divisions of cyanine dye chemistry and is also in agreement with that used in the co-pending application referred to above.

The bases which are used in the present application conform to the general type:

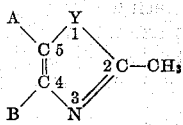

where Y represents oxygen, sulfur or selenium. This gives the bases termed oxazoles, thiazoles or selenazoles respectively. A and B represent univalent atoms or groups such as hydrogen or aliphatic or aromatic groupings. The 4,5 carbon atoms are joined by an ethylenic linkage. The numbering of the molecule as shown follows a system in general usage. It is that used, for instance in Richter's Lexikon der Kohlenstoff Verbindungen.

Many 2-methylthiazoles are described in the chemical literature. 2,4-dimethyloxazole is described by Schuften (Ber., 1895, 28, 3070) (see also Oesterreich, Ber., 1897, 30, 2254) and the 2-methylselenazoles are described and claimed in the co-pending application of Brooker and White, Serial No. 619,959 filed of even date herewith (now U. S. Patent 2,005,411, dated June 18, 1935).

The general formula for a dye of the type described in this invention is as follows—

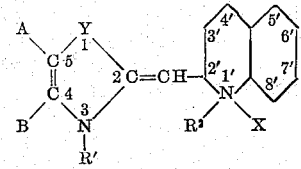

the corresponding sides of the unit across the and the general names proposed become—

1'-alkyl-3-alkyl-4-B-5-A$\begin{Bmatrix}\text{ox}\\\text{thi}\\\text{selen}\end{Bmatrix}$azolo-pseudo-cyanine salt according as Y represents oxygen, sulfur or selenium respectively. R' and $R^2$ represent alkyl groups, which may be similar or dissimilar and X represents a suitable acidic radical as will be apparent hereinafter.

The quinoline nucleus may be substituted or unsubstituted.

A general method for the preparation of these pseudo-cyanine (or ψ-cyanine) dyes is to treat an alkyl quaternary salt of the heterocyclic base containing a reactive methyl group with an alkyl halide of a 2-halogeno-quinoline, especially a 2-iodoquinoline, using an alkali or other suitable base to effect the condensation. For instance caustic soda or caustic potash may be employed, the reaction being performed with one of the lower alcohols as solvent. Instead of the alkali, an organic base such as triethylamine may be used, with an alcohol as solvent, or again another method is to treat the two quaternary salts described above with quinoline. In this case dye formation can be seen to be occurring even in the cold but it is convenient to carry out the reaction at an elevated temperature of 100° C. or somewhat higher. Certain of these methods are also described in my co-pending application Serial No. 659,629 filed February 6, 1933 (now U. S. Patent 1,969,448, dated August 7, 1934) which treats of the preparation and use of the oxa-ψ-cyanines. The various methods are also illustrated by the examples given in this application.

It may be noted here that it is desirable to have the 2-iodoquinoline salts well pulverized for the reactions. The other salts used should also be finely divided except where they are quite soluble in the solvent employed, in which case it is not especially necessary.

The parts mentioned in the examples are parts by weight.

In general the dyes dealt with in this application are useful as sensitizers of photographic emulsions for the green and blue green portion of the spectrum.

Dealing more specifically with the invention, 2,4-dimethylthiazole, for instance, may be converted into a quaternary salt by heating it with an alkyl halide or an alkyl ester of an aromatic sulfonic acid or a dialkylsulfate. If methyl p-toluene-sulfonate be chosen, there results 2,4-dimethylthiazole metho-p-toluenesulfonate, as shown below—

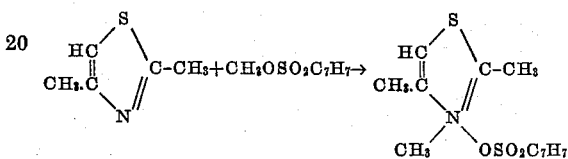

To prepare the dye, this salt may then be treated with the 2-iodoquinoline alkyl halide. If 2-iodoquinoline ethiodide be chosen for this step, and the condensation is brought about by the use of alcoholic caustic potash, the reaction may be formulated as follows—

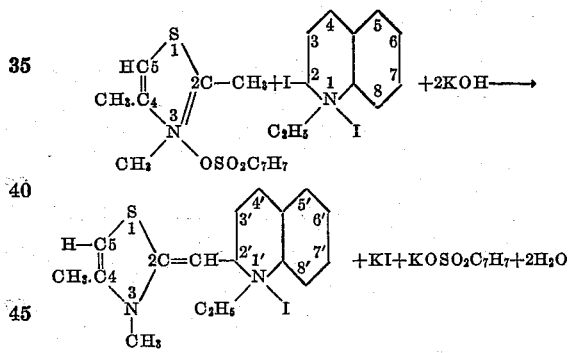

The above dye is named 3,4-dimethyl-1'-ethyl-thiazolo-ψ-cyanine iodide. The dyes are usually isolated as the iodides, since these are in general much less soluble than, for instance, the corresponding p-toluenesulfonates, bromides and chlorides.

In place of the caustic alkali employed as above, a strong organic base, for instance triethylamine, may be used, a total of two molecular proportions of the triethylamine being employed for one molecular proportion of each of the two participating alkyl quaternary salts involved in the reaction. In this case also it is convenient to use one of the lower alcohols as solvent. Resulting from this reaction there is formed, in addition to the dye, salts of triethylamine comparable to the potassium salts formed in the above reaction.

If quinoline is employed in place of the ethyl alcoholic caustic potash, the reaction may be written—

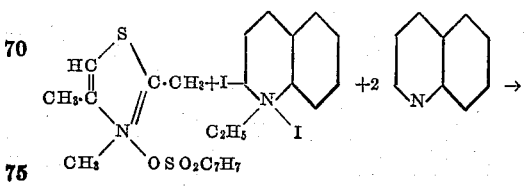

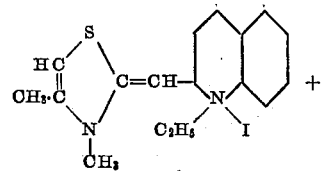

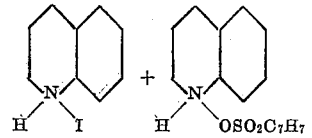

The quinoline is conveniently employed in excess of the quantity indicated in the above reaction, and its function is then as a solvent as well as a participator in the reaction.

The foregoing will also illustrate the manner in which the reactions may occur when starting with an oxazole or a selenazole in place of a thiazole.

As before mentioned since the 2-methyl-selenazoles referred to herein are not described in the literature, a general method for their preparation will be given hereinafter, although as before stated these are the joint invention of myself and Frank L. White and are fully described and claimed in co-pending application Serial No. 619,959 filed of even date herewith.

The 2-methylselenazoles are of the following general structure

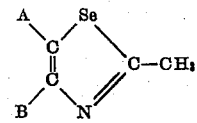

where A and B are univalent atoms or groups such as hydrogen, alkyl or aryl.

A general method of preparation of these new bases is as follows. A halogeno ketone or aldehyde of the type known generally as an alpha-halogeno ketone or aldehyde is used. Examples of such compounds are given below:

(a) H.CO.CH₂Cl, chloroacetaldehyde
(b) CH₃COCH₂Cl, chloroacetone
(c) C₆H₅COCH₂Br, phenacylbromide
(d) C₆H₅COCH(CH₃)Br, bromopropiophenone One of these compounds is then allowed to react with selenoacetamide (see Kindler, Annalen, 1923, 431, 187) either alone or in the presence of a solvent such as ethyl alcohol, under conditions illustrated in the examples given below.

For instance, using chloroacetone (Example b above) the equation may be written

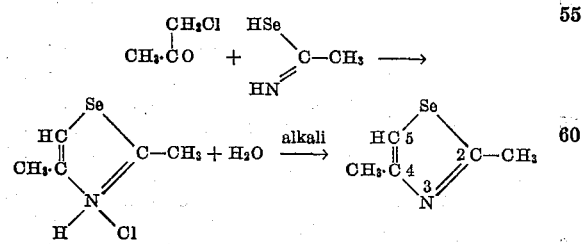

The product of the above reaction is named 2,4-dimethylselenazole, and is a liquid having a boiling point of 56–58° C. at 17 mm. and has an odor almost indistinguishable from that of 2,4-dimethylthiazole. The numbering used for the nucleus is that in common usage for the related sulfur-containing bases, the thiazoles.

If phenacyl bromide is used, the product is 4-phenyl-2-methylselenazole which is a solid with a melting point of 63–64° C.

The following will serve to illustrate the reaction. In the preparation of 2,4-dimethylselenazole, 23 parts of chloroacetone were diluted somewhat with 8 parts of absolute ethyl alcohol, the whole warmed gently on a waterbath and 30 parts of freshly prepared selenoacetamide were added in several small portions with thorough shaking, each portion being allowed to react before the next was added. The whole was then heated at 100° for 15 minutes. The mass was cooled, shaken with 200 parts of water, the aqueous extract made strongly alkaline with caustic soda and the base extracted with ether. The ether layer was dried with anhydrous potassium carbonate, filtered, the solvent evaporated and the base distilled. The 2,4-dimethylselenazole distilled at 56–58° C. at 17 mm. It is a colorless liquid with an odour almost indistinguishable from that of 2,4-dimethylthiazole.

The following examples illustrate the preparation of my new dyes:

Example I

*1′,3,4-trimethyloxazolo-ψ-cyanine iodide*

One part of 2,4-dimethyloxazole was heated with 1.9 parts of methyl p-toluenesulfonate for six hours at 100° C. during the course of which the 2,4-dimethyloxazole metho-p-toluenesulfonate solidified. This salt was crushed and heated with 4 parts of pulverized 2-iodoquinoline methiodide and 20 parts of quinoline at 130–150° C. for twelve minutes and then at 150° for ten minutes, with constant agitation. On cooling the dye separated and was filtered off, washed, and given two recrystallizations from methyl alcohol. The dye formed light brown crystals and gave an orange-yellow solution in methyl alcohol.

Example II

*3,4-dimethyl-1′-ethyloxazolo-ψ-cyanine iodide*

One part of 2,4-dimethyloxazole was converted into the metho-p-toluenesulfonate using 1.9 parts of methyl p-toluenesulfonate as described in the preceding example. The salt was dissolved in 20 parts of hot absolute ethyl alcohol and 4.1 parts of 2-iodoquinoline ethiodide added, the whole brought to boiling point and a solution of 2 parts of triethylamine in 6 parts of absolute ethyl alcohol added gradually with constant agitation. On refluxing again the dye separated out from the reaction mixture in yellow needles and refluxing was continued for 10 minutes. The dye was subsequently removed and purified by washing followed by recrystallization from methyl alcohol. The color of the solution was orange yellow and the dye formed somewhat amber yellow needles.

Example III

*4-phenyl-3-methyl-1′-ethyloxazolo-ψ-cyanine iodide*

1.6 parts of 4-phenyl-2-methyloxazole, made according to Blümlein (Ber., 1884, 17, 2578, see also Lewy, Ber., 1887, 20, 2576; Ber., 1888, 21, 924) were heated with 1.9 parts of methyl p-toluenesulfonate for 18 hours at 100°. The crude quaternary salt was dissolved in 20 parts of hot absolute ethyl alcohol, 4.1 parts of 2-iodoquinoline ethiodide added, the whole brought to boiling and 2 parts of triethylamine, diluted with 8 parts of absolute ethyl alcohol, added in portions with shaking. The dye rapidly separated from the hot liquid and boiling under reflux was continued for a further 10 minutes. The dye was removed, washed and crystallized from methyl alcohol when it formed yellow needles which gave an orange-yellow solution.

Example IV

*3-methyl-1′-ethylthiazolo-ψ-cyanine iodide*

One part of 2 methylthiazole was heated with 1.9 parts of methyl p-toluenesulfonate at 100° C. for half an hour. The 2-methylthiazole metho-p-toluenesulfonate that was formed solidified readily. This was dissolved in 18 parts of absolute ethyl alcohol, 4.1 parts of finely pulverized 2-iodoquinoline ethiodide were added and the mixture brought to boiling point under reflux. 1.4 parts of 85% caustic potash dissolved in 8 parts of hot absolute ethyl alcohol were then gradually added to the boiling suspension, and with good stirring. The liquid turned brownish and solid separated and the whole was refluxed for a further seven minutes. The whole was set aside to cool and the dye filtered off, washed and purified by recrystallization from methyl alcohol. The pure dye consists of brown crystals with a greenish reflex and gives an orange solution in methyl alcohol.

The same dye was obtained when the 2.9 parts of 2-methylthiazole metho-p-toluenesulfonate, made as above, were heated with 4.1 parts of 2-iodoquinoline ethiodide and 25 parts of quinoline to about 150° C. for ten minutes, with constant agitation. The salts dissolved and the liquid became a deep orange color. The whole was allowed to cool and the dye was precipitated by mixing with 80 parts of ether, the ethereal layer being subsequently decanted. The dye, after extraction of tarry impurities, was recrystallized several times from methyl alcohol.

Example V

*4-methyl-1′,3-diethylthiazolo-ψ-cyanine iodide*

2.7 parts of 2,4-dimethylthiazole ethiodide were dissolved in 20 parts of absolute ethyl alcohol, 4.1 parts of 2-iodoquinoline ethiodide added, the whole brought to boiling and the condensation was carried out by adding a solution of 1.4 parts of 85% caustic potash dissolved in 12 parts of the solvent, refluxing for about twenty minutes. After cooling the dye was filtered off, washed and purified by recrystallization from methyl alcohol in which it gave an orange solution. The dye formed scarlet needles.

Example VI

*4-phenyl-1′,3-dimethylthiazolo-ψ-cyanine iodide*

To parts of 2-iodoquinoline methiodide, 1.6 parts of 4-phenyl-2-methylthiazole methiodide and 20 parts of methyl alcohol were boiled and a solution of 0.4 part of caustic soda dissolved in 24 parts of methyl alcohol added and the whole boiled under reflux for 15 minutes longer. After cooling the dye was filtered off, washed with water and recrystallized from methyl alcohol. Scarlet needles were obtained giving an orange solution.

This dye was also made by heating 2 parts and 1.6 parts of the two quaternary salts, in the order given above, with 10 parts of quinoline to 150° C. for ten minutes. The dye was isolated and purified as described for the dye in the second part of Example I.

A third method of making this dye is as follows. The 2 parts and the 1.6 parts of the two quaternary salts, again taken in the same order, were refluxed with 30 parts of absolute ethyl alcohol and 1 part of triethylamine. Boiling was continued for ten minutes and the dye separated out during the course of the reaction. The whole was set aside to cool, the dye was filtered off, washed and recrystallized from methyl alcohol.

EXAMPLE VII 4-phenyl-3,5-dimethyl-1'-ethylthiazolo-ψ-cyanine iodide 3.3 parts of 4-phenyl-2,5-dimethylthiazole methiodide were heated with 4.1 parts of 2-iodoquinoline ethiodide in 25 parts of quinoline at 130-140° C. for fifteen minutes with agitation. During this time the salts dissolved and the liquid became a deep orange color. The liquid was allowed to cool and the dye was precipitated by adding ether. The dye rapidly crystallized on stirring, the ethereal layer was decanted and the dye filtered off. The dye was washed and was recrystallized from methyl alcohol. It was thus obtained in the form of scarlet needles which gave an orange solution.

EXAMPLE VIII

1',3,4-trimethylselenazolo-ψ-cyanine iodide

One and six tenths parts of 2,4-dimethylselenazole were converted into the metho-p-toluenesulfonate of the base by heating with 1.9 parts of methyl p-toluenesulfonate at 100° C. for two hours. The solid product was well crushed and heated with 4 parts of 2-iodoquinoline methiodide in 20 parts of quinoline for 15 minutes at 130-140° C. After allowing the reaction mixture to cool, the dye was precipitated as a tar by mixing with ether and then the tar was stirred with acetone to promote crystallization. The dye was removed by filtration, washed with hot acetone and with water and purified by several recrystallizations from methyl alcohol, in which it gave an orange solution.

The dye was also made by dissolving the 3.5 parts of crude 2,4-dimethylselenazole, prepared as described above, in 20 parts of hot absolute ethyl alcohol, adding 4 parts of 2-iodoquinoline methiodide, bringing the suspension to boiling and adding a solution of 2 parts of triethylamine in 8 parts more of absolute ethyl alcohol. The dye rapidly separated from the boiling solution which was refluxed for a further 10 minutes. The dye was removed, washed and crystallized from methyl alcohol, and was obtained in reddish-brown compact prisms and gave a deep orange solution in the solvent.

EXAMPLE IX 4-methyl-1',3-diethylselenazolo-ψ-cyanine iodide 1.6 parts of 2,4-dimethylselenazole were heated with 2 parts of ethyl p-toluenesulfonate at 100° C. for 20 hours and the crude quaternary salt was then heated with 4.1 parts of 2-iodoquinoline ethiodide and 20 parts of quinoline at 120-130° C. for 15 minutes. The dye was subsequently deposited as a tar by adding ether to the cold reaction mixture and purified as described for the dye in Example VIII. It gave a deep orange solution in methyl alcohol, from which it crystallized in reddish-brown needles.

EXAMPLE X 4-phenyl-3-methyl-1'-ethylselenazolo-ψ-cyanine iodide 1.1 parts of 4-phenyl-2-methylselenazole was converted into the metho-p-toluenesulfonate by heating with 0.95 part of methyl p-toluenesulfonate for 12 hours at 100°. The crude quaternary salt was dissolved in 20 parts of absolute ethyl alcohol, 2.05 parts of 2-iodoquinoline ethiodide added, the whole brought to boiling point and 1 part of triethylamine dissolved in 8 parts of absolute ethyl alcohol added gradually, with shaking. The whole was then refluxed a further 15 minutes, during which time the dye separated in crystalline form. After cooling the crystals were removed and recrystallized from methyl alcohol, and the dye was obtained in beautiful red needles which gave an orange solution in the solvent.

From the foregoing it will be apparent that these pseudo cyanines may be prepared from either the unsubstituted 2-methyl-oxazoles, -thiazoles, or -selenazoles, or from ones which have a substituent attached to either or both of the 4,5 carbon atoms and that the nitrogen atoms of the two nuclei in the dye molecule may have similar or dissimilar groups attached thereto. The quinoline group may also be substituted or unsubstituted. While the presence or absence of these substituents or the particular character thereof may affect the range of sensitization of these dyes or the ease or yield with which they are formed, their presence or absence does not affect the general principles of my invention as the condensation is between the nuclei, the substituents not taking an active part in the condensation. Further, I do not restrict the operation of my process to a condensation occurring in the presence only of the specific condensing agents named, as equivalent strong organic or inorganic bases may be employed for the purpose as will be apparent to those skilled in the art, from reading the foregoing specification.

For instance, many other bases may be substituted for triethylamine which may be regarded as a typical strong organic base. For example, n-methylpiperidine and triethanolamine may be employed, the results with these two bases being quite good. These two bases are also tertiary bases, but I do not restrict myself to bases of this class, since diethylamine, which is a secondary base may be employed. The primary base n-propylamine yields some of the dyes, as also does alcoholic ammonia and even aqueous ammonia, but the stronger tertiary bases are preferred. If one condensing agent is satisfactory for one particular condensation it does not follow that it will be equally satisfactory for all of the others, but it is obvious to those skilled in the art that the most suitable condensing agent for any particular condensation may be selected from the variety of alkalis and bases herein described. In general, triethylamine has been found to work particularly well.

Other variations and equivalents will doubtless occur to those skilled in this art, it being understood that the foregoing is intended only to illustrate to those skilled in the art how an oxazole, thiazole, or selenazole nucleus may be condensed with a quinoline nucleus to form highly useful and novel chemical compounds.

What I claim as my invention and desire to secure by Letters Patent of the United States is:

1. A pseudo cyanine salt having the following structure

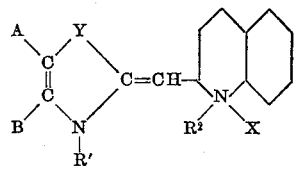

in which R' and R² represent alkyl groups, X represents an acid radical, A and B each represents a member selected from the group consisting of hydrogen, alkyl groups, and aryl groups of the benzene series and Y represents an atom selected from the group consisting of oxygen, sulfur and selenium.

2. A pseudo cyanine salt having the following structure

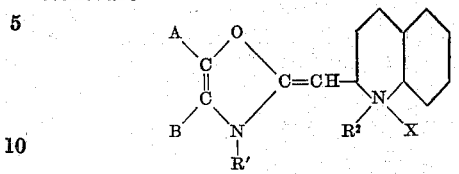

in which R' and R² represent alkyl groups, X represents an acid radical, A and B each represents a member selected from the group consisting of hydrogen, alkyl groups and aryl groups of the benzene series.

3. A pseudo cyanine salt having the following structure

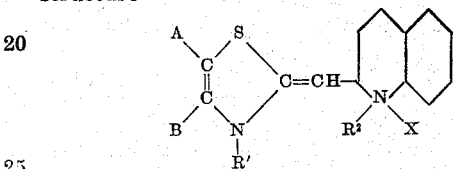

in which R' and R² represent alkyl groups, X represents an acid radical, A and B each represents a member selected from the group consisting of hydrogen, alkyl groups and aryl groups of the benzene series.

4. A pseudo cyanine salt having the following structure

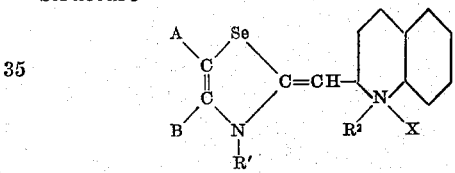

in which R' and R² represent alkyl groups, X represents an acid radical, A and B each represents a member selected from the group consisting of hydrogen, alkyl groups and aryl groups of the benzene series.

5. A 1'-alkyl-3-alkyl - oxazolo-pseudo - cyanine salt.

6. A 1'-alkyl-3-alkyl-thiazolo-pseudo - cyanine salt.

7. A 1'-alkyl-3-alkyl - selenazolo - pseudo-cyanine salt.

8. A pseudo-cyanine salt having the following structure

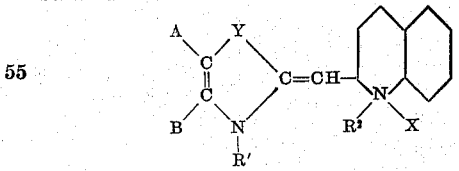

in which R' and R² represent alkyl groups, X represents an acid radical, A equals hydrogen and B represents a member selected from the group consisting of alkyl groups and aryl groups of the benzene series and Y represents an atom selected from the group consisting of oxygen, sulfur and selenium.

9. A pseudo-cyanine salt having the following structure

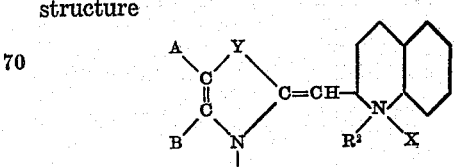

in which R' and R² represent alkyl groups, X represents an acid radical, A equals hydrogen and B represents a phenyl group and Y represents an atom selected from the group consisting of oxygen, sulfur and selenium.

10. A 4-phenyl-1',3-dimethylthiazolo - pseudo-cyanine salt.

11. A 4 - phenyl - 3 - methyl - 1' - ethyloxazolo-pseudo-cyanine salt.

12. A 4-phenyl - 3 - methyl-1'-ethylselenazolo - pseudo-cyanine salt.

13. The process of preparing pseudocyanine dyes which comprises condensing, in the presence of a base, a 2-iodoquinolinium alkyl quaternary salt with a 2-methyl alkyl quaternary salt having the general formula

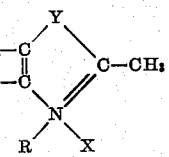

in which R represents an alkyl group, X represents an acid radical, A and B each represents a member selected from the group consisting of hydrogen, alkyl groups and aryl groups of the benzene series and Y represents an atom selected from the group consisting of oxygen, sulfur and selenium.

14. The process of preparing pseudo-cyanine dyes which comprises condensing, in the presence of a base, a 2-halogenoquinolinium alkyl quaternary salt with a 2-methyl alkyl quaternary salt having the general formula

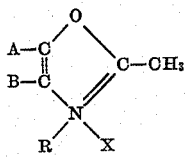

in which R represents an alkyl group, X represents an acid radical and A and B each represents a member selected from the group consisting of hydrogen, alkyl groups and aryl groups of the benzene series.

15. The process of preparing pseudo-cyanine dye which comprises condensing, in the presence of a base, a 2-halogenoquinolinium alkyl quaternary salt with a 2-methyl alkyl quaternary salt having the general formula

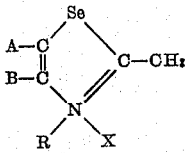

in which R represents an alkyl group, X represents an acid radical and A and B each represents a member selected from the group consisting of hydrogen, alkyl groups and aryl groups of the benzene series.

16. The process of preparing pseudo-cyanine dyes which comprises condensing, in the presence of a strong base, a 2-iodoquinolinium alkyl quaternary salt with a 2-methyl alkyl quaternary salt having the general formula

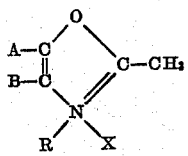

in which R represents an alkyl group, X represents an acid radical and A and B each represents a member selected from the group consisting of hydrogen, alkyl groups and aryl groups of the benzene series.

17. The process of preparing pseudo-cyanine dyes which comprises condensing, in the presence of a strong base, a 2-iodoquinolinium alkyl quaternary salt with a 2-methyl alkyl quaternary salt having the general formula

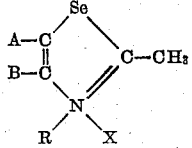

in which R represents an alkyl group, X represents an acid radical and A and B each represents a member selected from the group consisting of hydrogen, alkyl groups and aryl groups of the benzene series.

18. The process of preparing pseudo-cyanine dyes which comprises, condensing, in the presence of a strong base, a 2-iodoquinolinium alkyl quaternary salt with a 2-methyl alkyl quaternary salt having the general formula

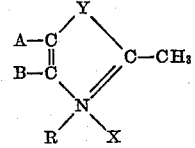

in which R represent alkyl, X represents an acid radical, A and B each represents a member selected from the group consisting of hydrogen, alkyl groups and aryl groups of the benzene series.

19. The process of preparing pseudo-cyanine dyes which comprises condensing, in the presence of a strong organic base, a 2-iodoquinolinium alkyl quaternary salt with a 2-methyl alkyl quaternary salt having the general formula

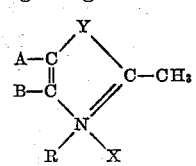

in which R represent an alkyl group, X represents an acid radical, A and B each represents a member selected from the group consisting of hydrogen, alkyl groups and aryl groups of the benzene series and Y represents an atom selected from the group consisting of oxygen, sulfur and sellenium.

20. The process of preparing pseudocyanine dyes which comprises condensing, in the presence of a trialkylamine, a 2-iodoquinolinium alkyl quaternary salt with a 2-methyl alkyl quaternary salt having the general formula

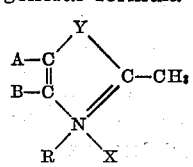

in which R represents an alkyl group, X represents an acid radical, A and B each represents a member selected from the group consisting of hydrogen, alkyl groups and aryl groups of the benzene series and Y represents an atom selected from the group consisting of oxygen sulfur and selenium.

21. The process of preparing pseudocyanine dyes which comprises condensing, in the presence of triethylamine, a 2-iodoquinolinium alkyl quaternary salt with a 2-methyl alkyl quaternary salt having the general formula

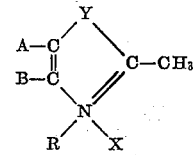

in which R represents an alkyl group, X represents an acid radical, A and B each represents a member selected from the group consisting of hydrogen, alkyl groups and aryl groups of the benzene series and Y represents an atom selected from the group consisting of oxygen, sulfur and selenium.

22. The process of preparing pseudo cyanine dyes which comprises condensing, under the influence of heat and in the presence of a base, a 2-halogeno-quinolinium alkyl quaternary salt with a compound having the following formula—

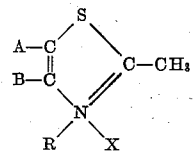

in which R represents an alkyl group, X an acid radical, and A and B each represents a member selected from the group consisting of hydrogen, alkyl groups and aryl groups of the benzene series.

23. The process of preparing pseudo cyanine dyes which comprises condensing, in the presence of a strong base, a 2-iodo-quinolinium alkyl quaternary salt with a compound having the general formula—

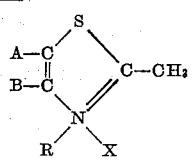

in which R represents an alkyl group, X an acid radical, and A and B each represents a member selected from the group consisting of hydrogen, alkyl groups and aryl groups of the benzene series.

24. The process of preparing pseudo-cyanine dyes which comprises condensing, in the presence of a base, a 2-halogeno-quinolinium alkyl quaternary salt with a 2-methyl alkyl quaternary salt having the general formula

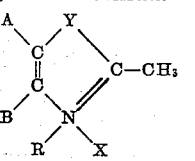

in which R represents an alkyl group, X represents an acid radical, A and B each represents a member selected from the group consisting of hydrogen, alkyl groups and aryl groups of the benzene series and Y represents an atom selected from the group consisting of oxygen, sulfur and selenium.

LESLIE G. S. BROOKER.